(12) United States Patent
Dai et al.

(10) Patent No.: US 11,956,114 B2
(45) Date of Patent: Apr. 9, 2024

(54) DEVICE MANAGEMENT METHOD, APPARATUS, AND SYSTEM, DEVICE, AND STORAGE MEDIUM

(71) Applicant: Huawei Technologies Co., Ltd., Shenzhen (CN)

(72) Inventors: Xinning Dai, Dongguan (CN); Rui Chen, Dongguan (CN); Chuxi Li, Dongguan (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/704,788

(22) Filed: Mar. 25, 2022

(65) Prior Publication Data

US 2022/0217036 A1 Jul. 7, 2022

Related U.S. Application Data

(63) Continuation of application No. PCT/CN2020/116011, filed on Sep. 17, 2020.

(30) Foreign Application Priority Data

Sep. 29, 2019 (CN) .......................... 201910934891.0
Nov. 1, 2019 (CN) .......................... 201911062081.7

(51) Int. Cl.
*H04L 41/0213* (2022.01)
*H04L 41/0813* (2022.01)
(Continued)

(52) U.S. Cl.
CPC ...... *H04L 41/0213* (2013.01); *H04L 41/0813* (2013.01); *H04L 67/133* (2022.05);
(Continued)

(58) Field of Classification Search
CPC ............. H04L 41/0213; H04L 41/0813; H04L 67/133; H04L 67/141; H04L 67/50;
(Continued)

(56) References Cited

U.S. PATENT DOCUMENTS 1,023,585 A * 4/1912 Pfau .......................... F01D 3/02
415/910
10,230,585 B1 3/2019 A et al.
(Continued)

FOREIGN PATENT DOCUMENTS

CN 101945003 A 1/2011
CN 106257868 A 12/2016
(Continued)

OTHER PUBLICATIONS

R. Wilton et al, "Yang Schema Version Selection-draft," wilton-netmod-yang-ver-selection-00, Mar. 11, 2019, 16 pages.
(Continued)

*Primary Examiner* — Karen C Tang
(74) *Attorney, Agent, or Firm* — Conley Rose, P.C.

(57) ABSTRACT

A device management method includes a first network device sending a first remote procedure call (RPC) request message to a second network device, where the first RPC request message includes information about a third yet another next generation (YANG) module that is identifiable to the first network device. After the second network device switches to the third YANG module, the first network device establishes a control session between the first network device and the second network device based on the third YANG module. When the network device supports switching between YANG modules of different standards, the second network device is notified, by using an RPC, to switch to a YANG module supported by the first network device.

21 Claims, 18 Drawing Sheets

(51) Int. Cl.
*H04L 67/133* (2022.01)
*H04L 67/141* (2022.01)
*H04L 67/50* (2022.01)
*H04L 67/51* (2022.01)

(52) U.S. Cl.
CPC ............ *H04L 67/141* (2013.01); *H04L 67/50* (2022.05); *H04L 67/51* (2022.05)

(58) Field of Classification Search
CPC ... H04L 67/51; H04L 41/082; H04L 41/0853; H04L 41/0806; H04L 41/0226; H04L 41/045; H04L 41/20; H04L 41/0866; H04L 41/0859; H04L 41/145; H04L 41/08
USPC ........................................................ 709/231
See application file for complete search history.

(56) References Cited

U.S. PATENT DOCUMENTS

| | | | |
|---|---|---|---|
| 10,326,657 | B1 | 6/2019 | A et al. |
| 2012/0110028 | A1 | 5/2012 | Athreya et al. |
| 2016/0350095 | A1 | 12/2016 | Ramachandran et al. |
| 2017/0078158 | A1* | 3/2017 | Dec .................. H04L 41/08 |
| 2017/0187577 | A1 | 6/2017 | Nevrekar et al. |
| 2018/0013662 | A1 | 1/2018 | Salam et al. |
| 2019/0245732 | A1 | 8/2019 | Luo et al. |

FOREIGN PATENT DOCUMENTS

| | | |
|---|---|---|
| CN | 106656792 A | 5/2017 |
| CN | 109474487 A | 3/2019 |
| CN | 109947995 A | 6/2019 |
| CN | 109951315 A | 6/2019 |
| WO | 2018049677 A1 | 3/2018 |

OTHER PUBLICATIONS

A. Ivanov et al, "Application of Yang Modeling to JSON RPCs for Interoperability Purposes," draft-yang-json-rpc-00, Feb. 22, 2017, 24 pages.

RFC 6020, M. Bjorklund, Ed. et al, "Yang—A Data Modeling Language for the Network Configuration Protocol (NETCONF)," Oct. 2010, 173 pages.

RFC 6241, R. Enns, Ed. et al, "Network Configuration Protocol (NETCONF)," Jun. 2011, 113 pages.

RFC 7950, M. Bjorklund, Ed., "The Yang 1.1 Data Modeling Language," Aug. 2016, 217 pages.

RFC 8342, M. Bjorklund et al, "Network Management Datastore Architecture (NMDA)," Mar. 2018, 44 pages.

RFC 8525, A. Bierman et al, "Yang Library," Mar. 2019, 32 pages.

FC 8526, M. Bjorklund et al, "NETCONF Extensions to Support the Network Management Datastore Architecture," Mar. 2019, 23 pages.

* cited by examiner

```
module:ietf-yang-library
  +--ro yang-library
     +--ro module-set*[name]
     |  +--ro name                         string
     |  +--ro module*[name]
     |  |  +--ro name                      yang:yang-identifier
     |  |  +--ro revision?                 revision-identifier
     |  |  +--ro namespace                 inet:uri
     |  |  +--ro location*                 inet:uri
     |  |  +--ro submodule*[name]
     |  |  |  +--ro name                   yang:yang-identifier
     |  |  |  +--ro revision?              revision-identifier
     |  |  |  +--ro location*              inet:uri
     |  |  +--ro feature*                  yang:yang-identifier
     |  |  +--ro deviation*                ->../../module/name
     |  +--ro import-only-module*[name revision]
     |     +--ro name                      yang:yang-identifier
     |     +--ro revision                  union
     |     +--ro namespace                 inet:uri
     |     +--ro location*                 inet:uri
     |     +--ro submodule*[name]
     |        +--ro name                   yang:yang-identifier
     |        +--ro revision?              revision-identifier
     |        +--ro location*              inet:uri
     +--ro schema*[name]
     |  +--ro name                         string
     |  +--ro module-set*                  ->../../module-set/name
     +--ro datastore*[name]
     |  +--ro name                         ds:datastore-ref
     |  +--ro schema                       ->../../schema/name
     +--ro content-id                      string
```

FIG. 3

```
module:yang-library-packages
  augment /yanglib: yang-library:
    +--ro package*[name version]
      +--ro name                 yang:yang-identifier
      +--ro version              yang-sem-ver
      +--ro revision-date?       yanglib:revision-identifier
      +--ro location*            inet:uri
      +--ro description?         string
      +--ro reference?           string
      +--ro mandatory-feature*   string
          +--ro imported-packages* [name version]
          |  +--ro name      yang:yang-identifier
          |  +--ro version   yang-sem-ver
          |  +--ro deviated? boolean
          +--ro loaded               boolean
      +--ro incompatible-packages*[name]
          |  +--ro name      yang:yang-identifier
          |  +--ro version   yang-sem-ver
  augment /yanglib: yang-library:
    +--ro working-package*[name version]
      +--ro name     -> /yanglib:yang-library/package/name
      +--ro version    leafref
  augment /yanglib: yang-library/yanglib:module-set:
    +--ro package
      +--ro name?    -> /yanglib:yang-library/package/name
      +--ro version?   leafref
```

FIG. 4

```
<ietf-yang-library>
    <package>
        <name>huawei-evpn</name>
        <version>1.0.0</ version >
        <loaded>true</ loaded >
        <imported-packages>
            <name>huawei-l2vpn</name>
            <version>1.0.0</ version >
        </imported-packages>
        <imported-packages>
            <name>huawei-network-device</name>
            <version>1.1.0</ version >
        </imported-packages>
        <incompatile-packages>
            <name>ietf-evpn</name>
            <version>1.0.0</ version >
        </incompatile-packages>
        <incompatile-packages>
            <name>openconfig-evpn</name>
            <version>1.0.0</ version >
        </incompatile-packages>
    </package>
    <package>
        <name>huawei-l2vpn</name>
        <version>1.0.0</ version >
        <loaded>true</ loaded >
        <imported-packages>
            <name>huawei-network-device</name>
            <version>1.1.0</ version >
        </imported-packages>
        <incompatile-packages>
            <name>ietf-l2vpn</name>
            <version>1.0.0</ version >
        </incompatile-packages>
        <incompatile-packages>
            <name>openconfig-l2vpn</name>
            <version>1.0.0</ version >
        </incompatile-packages>
    </package>
```

CONT.
FROM
FIG. 5A

```xml
<package>
    <name>huawei-network-device</name>
    <version>1.1.0</version>
    <loaded>true</loaded>
    <imported-packages>
       <name>ietf-data</name>
       <version>1.0.0</version>
    </imported-packages>
    <incompatile-packages>
       <name>ietf-network-device</name>
       <version>1.1.0</version>
    </incompatile-packages>
    <incompatile-packages>
       <name>openconfig-network-device</name>
       <version>1.1.0</version>
    </incompatile-packages>
</package>
<package>
    ...
</package>

<working-package>
    <name>huawei-evpn</name>
    <version>1.0.0</version>
</working-package>
<working-package>
    <name>huawei-l2vpn </name>
    <version>1.0.0</version>
</working-package>
<working-package>
    <name>huawei-network-device</name>
    <version>1.1.0</version>
</working-package>
</ietf-yang-library>
```

FIG. 5B

```
+---x select-yang-packages
   +---w input
   |  +---w datastore*           [name]
   |     +---w name              string
   |     +---w package*          [name]
   |     |  +---w name           string
   |     |  +---w version        yang-sem-ver
   |     |  +---w with-imported!
   |     |     +---w exclude*    [name]
   |     |        +---w name     string
   |     +---w with-datastore*   string
```

```
<select-yang-packages>
    <datastore>
      <name>running</name>
      <package>
         <name>ietf-network-device</name>
         <version>1.1.2</ version >
      </package>
      <with-datastore>candidate</ with-datastore>
      <with-datastore>startup</ with-datastore>
      <with-datastore>operational</ with-datastore>
    </datastore>
</select-yang-packages>
```

FIG. 10

```
<rpc-reply message-id"101"
    xmlns="urn:ietf:params:xml:ns:netconf:base:1.0"
    xmlns:xc=" urn:ietf:params:xml:ns:netconf:base:1.0" >
    <rpc-error>
       <error-type>application</error-type>
       <error-tag>operation-failed</error-tag>
       <error-severity>error</error-severity>
       <error-path>
          /select-yang-packages/datastore[name='running']/package[name='ietf-network-device']
       </error-path>
       <error-message xml:lang="en" >
          missing imported packages: ietf-data.
       </error-message>
     </rpc-error>
   </rpc-reply>
```

FIG. 11

```
<rpc-reply message-id"101"
    xmlns="urn:ietf:params:xml:ns:netconf:base:1.0"
    xmlns:xc=" urn:ietf:params:xml:ns:netconf:base:1.0" >
  <rpc-error>
    <error-type>application</error-type>
    <error-tag>operation-failed</error-tag>
    <error-severity>error</error-severity>
    <error-path>
      /select-yang-packages/datastore[name='running']/package[name='ietf-network-device']
    </error-path>
    <error-message xml:lang="en" >
      there exist no such package in device: ietf-data.
    </error-message>
  </rpc-error>
</rpc-reply>
```

FIG. 12

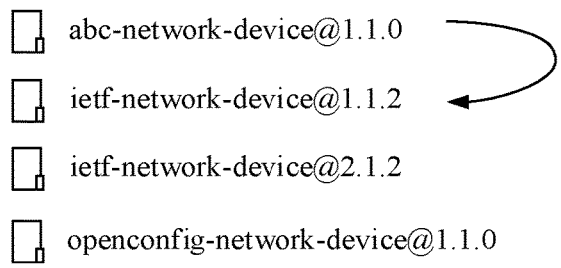

FIG. 13

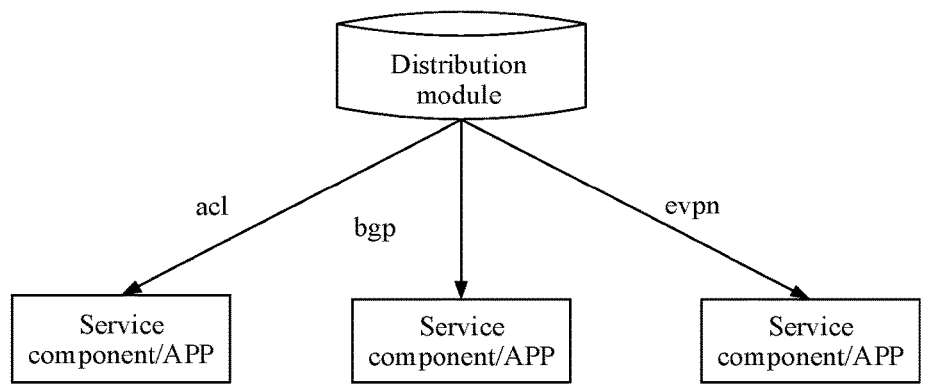

FIG. 14

```
<package>
    <name>ietf-network-device</name>
    <version>1.1.2</version>
    <apps>
        <app>/usr/local/apps/ietf-network-device</app>
    </apps>
</package>
<package>
    <name>huawei-network-device</name>
    <version>1.1.0</version>
    <apps>
        <app>/usr/local/apps/ huawei-network-device</app>
    </apps>
</package>
<package>
    ...
</package>
```

```
module:yang-library-packages
   augment/yanglib: yang-library:
      +--ro package*[name version]
         +--ro name                yang:yang-identifier
         +--ro version             yang-sem-ver
         +--ro revision-date?      yanglib:revision-identifier
         +--ro location*           inet:uri
         +--ro description?        string
         +--ro reference?          string
         +--ro mandatory-feature*  string
   augment/yanglib: yang-library/yanglib:schema:
      +--ro package
         +--ro name?    ->/yanglib:yang-library/package/name
         +--ro version? leafref
```

FIG. 22

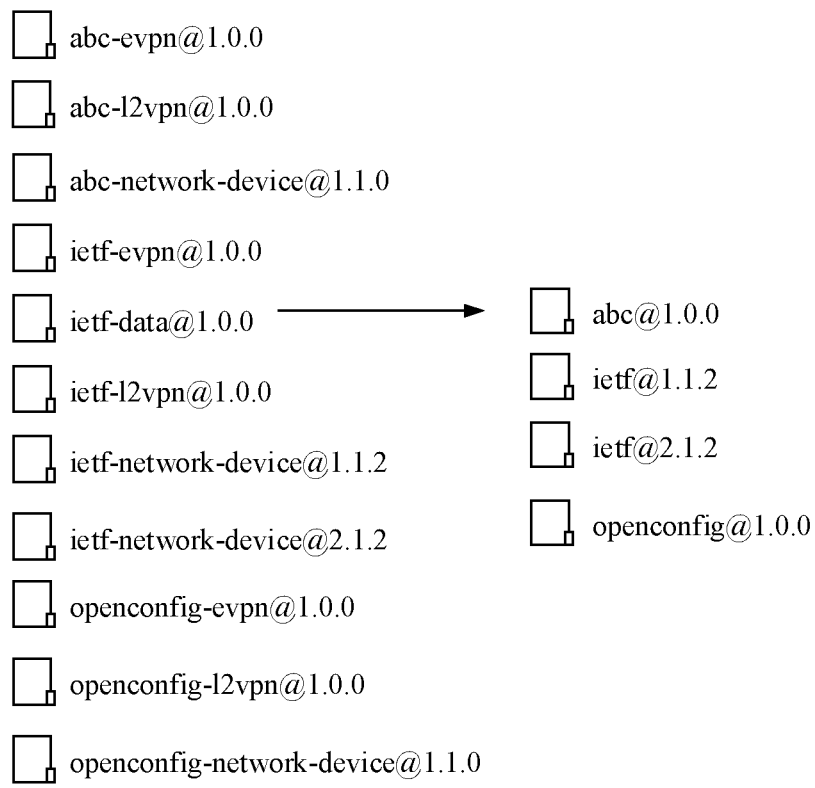

FIG. 23

DEVICE MANAGEMENT METHOD, APPARATUS, AND SYSTEM, DEVICE, AND STORAGE MEDIUM

CROSS-REFERENCE TO RELATED APPLICATIONS

This is a continuation of International Patent Application No. PCT/CN2020/116011 filed on Sep. 17, 2020, which claims priority to Chinese Patent Application No. 201910934891.0 filed on Sep. 29, 2019 and Chinese Patent Application No. 201911062081.7 filed on Nov. 1, 2019. All of the aforementioned patent applications are hereby incorporated by reference in their entireties.

TECHNICAL FIELD

This application relates to the field of communications technologies, and in particular, to a device management method, apparatus, and system, a device, and a storage medium.

BACKGROUND

As network scales become larger and more complex, and there are an increasing quantity of network devices, network service providers are required to automatically deploy new services quickly without errors. Command-line interfaces (CLIs) and Simple Network Management Protocol (SNMP) cannot meet network management requirements in the future. The Network Configuration Protocol (NETCONF) and the yet another next generation (YANG) technologies are designed to resolve these problems in existing configuration and management practices and shortcomings of conventional network management protocols. YANG is a data modeling language defined by the Internet Engineering Task Force (IETF) standards organization to model and describe network configuration and management data, and supports complete description of data between a NETCONF client and server. The YANG module is used to describe configuration data, status data, remote procedure calls (RPC), and notifications that are exchanged between the NETCONF client and server.

However, there are a plurality of standards for YANG modules in a network device, and a controller and the network device are usually developed independently. After the network device updates a version of a YANG module, some versions of the YANG module used by the controller may not match the version of the YANG module used by the network device. Once the YANG module of the new version in the network device is non-backwards-compatible, it is difficult for the controller to manage the network device. Therefore, how to manage the network device based on the YANG module is a problem to be urgently resolved.

SUMMARY

Embodiments of this application provide a device management method, apparatus, and system, a device, and a storage medium, to resolve a problem existing in the related technology. The technical solutions are as follows:

According to a first aspect, a device management method is provided. The method includes: obtaining, by a first network device, information about a second yet another next generation YANG module in a second network device, where the first network device is a network management device; determining, by the first network device based on the information about the second YANG module, a first YANG module that is in the first network device and that is associated with the second YANG module; determining, by the first network device, that the second YANG module is incompatible with the first YANG module, and sending, by the first network device, a first remote procedure call (RPC) request message to the second network device, where the first RPC request message includes information about a third YANG module that is identifiable to the first network device, the first YANG module includes the third YANG module, and the first RPC request message is used to trigger the second network device to switch a YANG module that is running to the third YANG module; and establishing, by the first network device, a control session between the first network device and the second network device based on the third YANG module.

According to the method provided in this embodiment of this application, when the network device supports switching between YANG modules of different standards, the second network device is notified, by using an RPC, to switch to a YANG module supported by the first network device. This can reduce dependence of the second network device on the first network device when the second network device is managed by the first network device, expand an application range of the network device, and improve device management efficiency.

In an example embodiment, the information about the third YANG module that is identifiable to the first network device includes version information of a set to which the third YANG module belongs.

In an example embodiment, the first RPC request message further includes first indication information, and the first indication information is used to indicate that a fourth YANG module on which the third YANG module depends is to be switched.

In an example embodiment, the first RPC request message further includes first option information, and the first option information is used to indicate that a target YANG module in the fourth YANG module on which the third YANG module depends remains unchanged.

In an example embodiment, the first RPC request message further includes second option information, the second option information is used to indicate that a target set is to be switched, and the target set is a set other than the set to which the third YANG module belongs.

In an example embodiment, the second YANG module in the second network device is a YANG module that is currently running in the second network device.

In an example embodiment, before the first network device establishes the control session between the first network device and the second network device based on the third YANG module, the first network device receives an RPC reply message, where the reply message indicates that switching has been performed.

According to a second aspect, a device management method is provided. The method includes: receiving, by a second network device, a first RPC request message sent by a first network device, where the first RPC request message includes information about a third yet another next generation YANG module that is identifiable to the first network device, the third YANG module is included in a first YANG module, the first YANG module is determined by the first network device based on information about a second YANG module in the second network device, and the first RPC request message is used to trigger the second network device to switch a YANG module that is running to the third YANG module; and switching to the third YANG module based on the first RPC request message, and establishing a control session between the first network device and the second network device based on the third YANG module.

In an example embodiment, the switching to the third YANG module based on the first RPC request message includes: unloading a currently loaded YANG module and loading the third YANG module based on the first RPC request message.

In an example embodiment, after the switching to the third YANG module based on the first RPC request message, the method further includes: terminating an original service component, and running a new service component corresponding to the third YANG module.

In an example embodiment, the terminating an original service component, and running a new service component corresponding to the third YANG module includes: generating, by the second network device, first difference information based on data of the unloaded YANG module, and generating second difference information based on data of the third YANG module; and controlling, based on the first difference information, the original service component to clear and release a resource, and running, based on the second difference information, the new service component corresponding to the third YANG module to execute a service.

In an example embodiment, after the switching to the third YANG module based on the first RPC request message, the method further includes: when the first RPC request message further includes first indication information, switching a fourth YANG module on which the third YANG module depends, where the first indication information is used to indicate that the fourth YANG module on which the third YANG module depends is to be switched.

In an example embodiment, after the switching to the third YANG module based on the first RPC request message, the method further includes: when the first RPC request message further includes first option information, switching a non-target YANG module in the fourth YANG module on which the third YANG module depends, where the first option information is used to indicate that a target YANG module in the fourth YANG module on which the third YANG module depends remains unchanged.

In an example embodiment, after the switching to the third YANG module based on the first RPC request message, the method further includes: switching a target set when the first RPC request message further includes second option information, where the second option information is used to indicate that the target set is to be switched, and the target set is a set other than a set to which the third YANG module belongs.

In an example embodiment, before the unloading a currently loaded YANG module and loading the third YANG module based on the first RPC request message, the method further includes: obtaining a YANG module list based on the currently loaded YANG module and the third YANG module, where the YANG module list does not include a YANG module that conflicts with the third YANG module; detecting whether a dependency chain for the YANG module list is complete; and when the dependency chain for the YANG module list is complete, performing the step of unloading a currently loaded YANG module and loading the third YANG module based on the first RPC request message.

According to a third aspect, a device management apparatus is provided. The apparatus is applied to a first network device and includes: an obtaining module, configured to obtain information about a second yet another next generation YANG module in a second network device, where the first network device is a network management device; a determining module, configured to: determine, based on the information about the second YANG module, a first YANG module that is in the first network device and that is associated with the second YANG module; and determine that the second YANG module is incompatible with the first YANG module; a sending module, configured to send a first RPC request message to the second network device, where the first RPC request message includes information about a third YANG module that is identifiable to the first network device, the first YANG module includes the third YANG module, and the first RPC request message is used to trigger the second network device to switch a YANG module that is running to the third YANG module; and an establishment module, configured to establish a control session between the first network device and the second network device based on the third YANG module.

In an example embodiment, the information about the third YANG module that is identifiable to the first network device includes version information of a set to which the third YANG module belongs.

In an example embodiment, the first RPC request message further includes first indication information, and the first indication information is used to indicate that a fourth YANG module on which the third YANG module depends is to be switched.

In an example embodiment, the first RPC request message further includes first option information, and the first option information is used to indicate that a target YANG module in the fourth YANG module on which the third YANG module depends remains unchanged.

In an example embodiment, the first RPC request message further includes second option information, the second option information is used to indicate that a target set is to be switched, and the target set is a set other than the set to which the third YANG module belongs.

In an example embodiment, the second YANG module in the second network device is a YANG module that is currently running in the second network device.

In an example embodiment, before the first network device establishes the control session between the first network device and the second network device based on the third YANG module, the first network device receives an RPC reply message, where the reply message indicates that switching has been performed.

According to a fourth aspect, a device management apparatus is provided. The apparatus is applied to a second network device and includes: a receiving module, configured to receive a first RPC request message sent by a first network device, where the first RPC request message includes information about a third yet another next generation YANG module that is identifiable to the first network device, the third YANG module is included in a first YANG module, the first YANG module is determined by the first network device based on information about a second YANG module in the second network device, and the first RPC request message is used to trigger the second network device to switch a YANG module that is running to the third YANG module; a switching module, configured to switch to the third YANG module based on the first RPC request message; and an establishment module, configured to establish a control session between the first network device and the second network device based on the third YANG module.

In an example embodiment, the switching module is configured to unload a currently loaded YANG module and load the third YANG module based on the first RPC request message.

In an example embodiment, the switching module is further configured to terminate an original service component, and run a new service component corresponding to the third YANG module.

In an example embodiment, the switching module is configured to: generate first difference information based on data of the unloaded YANG module, and generate second difference information based on data of the third YANG module; and control, based on the first difference information, the original service component to clear and release a resource, and run, based on the second difference information, the new service component corresponding to the third YANG module to execute a service.

In an example embodiment, the switching module is further configured to: when the first RPC request message further includes first indication information, switch a fourth YANG module on which the third YANG module depends, where the first indication information is used to indicate that the fourth YANG module on which the third YANG module depends is to be switched.

In an example embodiment, the switching module is further configured to: when the first RPC request message further includes first option information, switch a non-target YANG module in the fourth YANG module on which the third YANG module depends, where the first option information is used to indicate that a target YANG module in the fourth YANG module on which the third YANG module depends remains unchanged.

In an example embodiment, the switching module is further configured to switch a target set when the first RPC request message further includes second option information, where the second option information is used to indicate that the target set is to be switched, and the target set is a set other than a set to which the third YANG module belongs.

In an example embodiment, the apparatus further includes: an obtaining module, configured to obtain a YANG module list based on the currently loaded YANG module and the third YANG module, where the YANG module list does not include a YANG module that conflicts with the third YANG module; and a detection module, configured to detect whether a dependency chain for the YANG module list is complete.

The switching module is configured to: when the dependency chain for the YANG module list is complete, perform the step of unloading a currently loaded YANG module and loading the third YANG module based on the first RPC request message.

According to a fifth aspect, a first network device is further provided. The first network device is configured to perform the method according to any one of the first aspect.

According to a sixth aspect, a second network device is further provided. The second network device is configured to perform the method according to any one of the second aspect.

According to a seventh aspect, a network device is further provided. The device includes a memory and a processor. The memory stores at least one instruction. The processor loads and executes the at least one instruction, to implement the method according to any one of the first aspect or the second aspect.

According to an eighth aspect, a computer-readable storage medium is further provided. The storage medium stores at least one instruction. A processor loads and executes the instruction, to implement the method according to any one of the first aspect or the second aspect.

According to a ninth aspect, a device management system is further provided. The system includes a first network device and a second network device. The first network device performs the method according to any one of the first aspect, and the second network device performs the method according to any one of the second aspect.

Another communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, or control the transceiver to send a signal. In addition, when the processor executes the instructions stored in the memory, the processor is enabled to perform the method according to any one of the foregoing possible implementations.

In an example embodiment, there are one or more processors, and there are one or more memories.

In an example embodiment, the memory may be integrated with the processor, or the memory and the processor are disposed separately.

In a specific implementation process, the memory may be a non-transitory memory, for example, a read-only memory (ROM). The memory and the processor may be integrated into one chip, or may be disposed in different chips. A type of the memory and a manner in which the memory and the processor are disposed are not limited in embodiments of this application.

A computer program is provided. The computer program includes computer program code. When the computer program code is run on a computer, the computer is enabled to perform the methods according to the foregoing aspects.

A chip is provided. The chip includes a processor. The processor is configured to invoke, from a memory, instructions stored in the memory and run the instructions, to enable a communications device on which the chip is installed to perform the methods according to the foregoing aspects.

Another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods according to the foregoing aspects.

BRIEF DESCRIPTION OF DRAWINGS

FIG. 3 is a schematic diagram of a structure of a YANG module according to an embodiment of this application;

FIG. 4 is a schematic diagram of a structure of a YANG module according to an embodiment of this application;

FIG. 5A and FIG. 5B are a schematic diagram of YANG modules having a conflict according to an embodiment of this application;

FIG. 10 is a schematic diagram of a structure of an RPC request according to an embodiment of this application;

FIG. 11 is a schematic diagram of a structure of an error prompt information according to an embodiment of this application;

FIG. 12 is a schematic diagram of a structure of an error prompt information according to an embodiment of this application;

FIG. 13 is a schematic diagram of a structure of a directory of a YANG module according to an embodiment of this application;

FIG. 14 is a schematic diagram of a structure of a service component according to an embodiment of this application;

FIG. 22 is a schematic diagram of a structure of a YANG module according to an embodiment of this application;

FIG. 23 is a schematic diagram of a YANG module in a directory form according to an embodiment of this application;

DESCRIPTION OF EMBODIMENTS

Terms used in embodiments of this application are merely used to explain specific embodiments of this application, but are not intended to limit this application.

As network scales become larger and more complex and there are an increasing quantity of network devices, network service providers are required to automatically deploy new services quickly without errors. NETCONF emerges to meet network management requirements in the future. However, with development and popularization of NETCONF in the industry, a data modeling language is urgently needed to cooperate with NETCONF. A YANG module is one of data modeling languages.

The YANG module is a data modeling language defined by the IETF standards organization to model and describe network configuration and management data, and can support complete description of data between a NETCONF client and server. The YANG module can be used to describe configuration data, status data, RPCs, and notifications that are exchanged between the NETCONF client and server.

Figure 1:
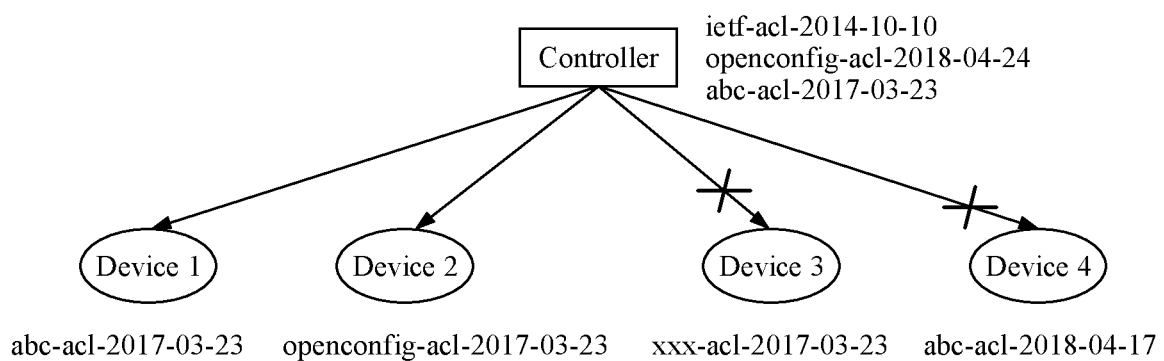
FIG. 1 is a schematic diagram of managing a network device by a controller according to an embodiment of this application.

There may be YANG modules of a plurality of standards in a network device. For example, the network device has an IETF YANG, an openconfig YANG, and a private YANG from a device vendor. These YANG modules of different standards are provided by different organizations. Therefore, compatibility between the YANG modules is poor. However, currently, in a service implementation, a factory device usually supports only a YANG module of a specific standard. As a result, it is relatively difficult for an operator to use a controller from a vendor A to manage a device from a vendor B. As shown in FIG. 1, for a device 3 that uses a private YANG file (xxx-ac1-2017-03-23.yang) from a vendor of the device 3, a controller cannot manage the device 3 because the controller does not have a capability of supporting the YANG file.

In addition, the controller and the device are usually developed independently. After the device updates a version of a YANG module, some versions of the YANG module used by the controller may not match the version of the YANG module used by the device. Once the YANG module of the new version in the device is non-backwards-compatible, it is also difficult for the controller to manage the device. When a device updates YANG files in the device and some YANG files of new versions are not backwards-compatible with the YANG files of earlier versions, the controller also cannot manage the device. For example, for a device 4 that updates a YANG module version to abc-ac1-2018-04-17 in FIG. 1, although the controller supports the YANG module of the version abc-ac1-2017-03-23, because a YANG file of a new version is not backwards-compatible with the YANG file of an earlier version, the controller still cannot manage the device 4 that updates the YANG module.

Figure 2:
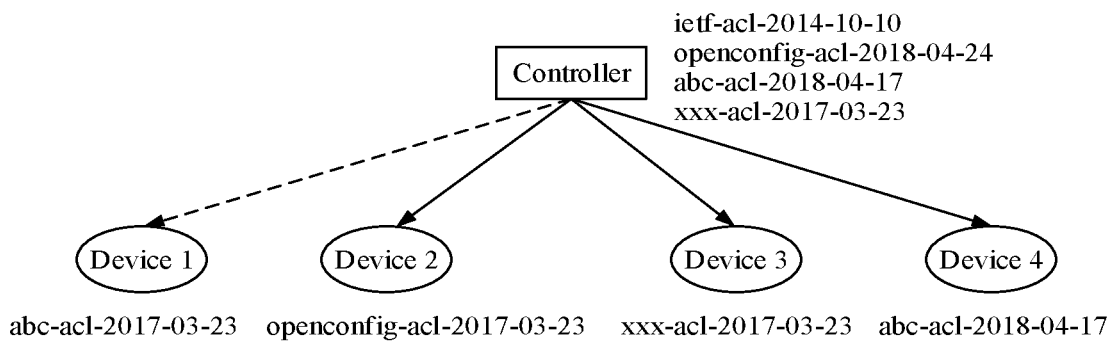
FIG. 2 is a schematic diagram of managing a network device by a controller according to an embodiment of this application.

In the related technology, to enable a controller to manage a device from a vendor, the controller side needs to store related YANG module files and support corresponding capabilities. After a device performs upgrading, if the controller needs to manage the device, the controller also needs to perform upgrading correspondingly. For example, for the devices and the controller shown in FIG. 1, to enable the controller to manage the device 3 having a YANG module whose version is xxx-ac1-2017-03-23, the controller stores the YANG module whose version is xxx-ac1-2017-03-23, as shown in FIG. 2. To enable the controller to manage the device 4 having a YANG module whose version is upgraded to abc-ac1-2018-04-17, the controller also upgrades a YANG module whose version is abc-ac1-2017-03-23 on the controller correspondingly, where the version is upgraded to abc-ac1-2018-04-17. However, in this manner, the device is managed by modifying a capability of the controller, so that the device needs to depend on the controller when being managed. This brings great pressure on development and maintenance of the controller, and reduces device management efficiency.

In view of this, an embodiment of this application provides a device management method. It is assumed that a managing device is a first network device and a managed device is a second network device. In the method, an RPC mechanism and a service process switching mechanism are designed, so that the second network device has a capability of performing switching between YANG modules of a plurality of different standards/versions. Serving as the managing device, the first network device can indicate, by delivering an RPC request, the second network device to switch to a YANG module set that can be identified and supported by the first network device, so that the second network device is successfully managed by the first network device without modifying a capability of the first network device. The first network device may be a controller or another northbound device (for example, a CLI).

According to the method provided in this embodiment of this application, when YANG modules are used, the YANG modules may be grouped for managing the YANG modules more conveniently. For example, YANG files defined by the IETF organization are classified into a group; YANG files defined by the OpenConfig organization are classified into a group; or according to service functions, YANG files related to an ac1 service are classified into a group, and YANG files related to a bgp service are classified into a group. Alternatively, different YANG files are classified into different groups according to time information. For example, schema or module-set in yang-library is used to implement grouping. Information about a YANG module group is shown in FIG. 3, and a single YANG module has version information.

Based on this, a concept of a YANG package is further introduced in this embodiment of this application. A YANG package is equivalent to a module set having version information. The YANG module group may be considered as a YANG package. A division standard for a YANG package is not limited in this embodiment of this application, provided that references between YANG modules in the YANG package are complete. For example, a YANG module on which a YANG module in the YANG package depends needs to be indexed in the YANG package or a dependent package of the YANG package. For example, a structure of a YANG package having version information provided in this embodiment of this application is shown in FIG. 4. For the YANG package, not only a single YANG module has version information, but version management may also be performed on the YANG package based on a version.

The version of the YANG package is not limited in this embodiment of this application, provided that different YANG packages can be differentiated. For example, the version of the YANG package may include three digits, for example, X·Y·Z. If the YANG package is updated to be non-backwards-compatible, a version value (X+1)·Y·Z is assigned to the YANG package of the new version. If the YANG package is updated to be backwards-compatible, a version value X·(Y+1)·Z or X·Y·(Z+1) is assigned to the YANG package of the new version.

In addition to the version information, the structure of the YANG package further includes some other information, as shown in FIG. 4. A loaded node in FIG. 4 indicates whether the YANG package has been loaded by a device, and has a default value false, indicating that the YANG package has not been loaded. In addition, in a service implementation, the device usually implements only a YANG module set of a specific standard. If the device simultaneously runs YANG module sets of a plurality of standards in the service implementation, a service conflict may occur. An incompatible-packages option in FIG. 4 specifies a package that conflicts with the package. Because the incompatible-packages is used, a plurality of incompatible module sets can be prevented from being simultaneously run during subsequent switching between module sets. A main reason for a conflict is usually that there is a YANG package formed from a YANG module set defined by another organization. A YANG package that is non-backwards-compatible can be identified based on a version number, and therefore is not listed in the structure shown in FIG. 4. For example, in a YANG package shown in FIG. 5A and FIG. 5B, for example, a huawei-evpn package specifies, by using an incompatible-packages option, that the huawei-evpn package conflicts with an ietf-evpn package, where <package> . . . </package> is used to represent some packages that are not listed.

In addition to the foregoing information, FIG. 4 further includes a working-package node. The working-package node indicates a list of YANG packages currently loaded by the device.

Figure 6:
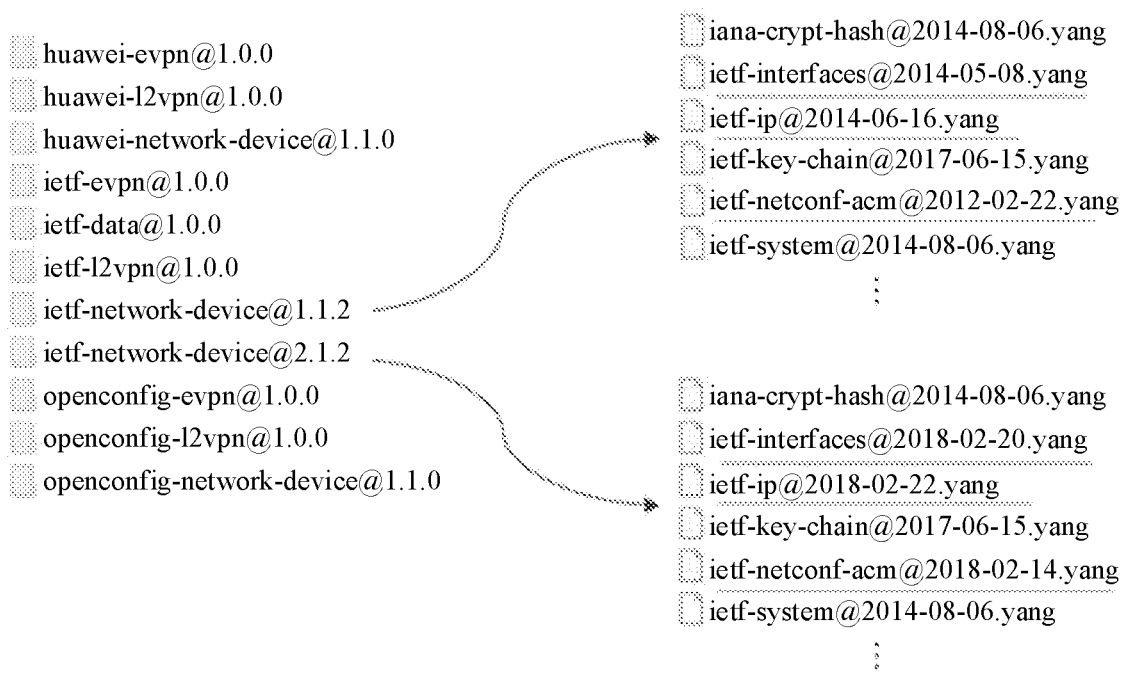
FIG. 6 is a schematic diagram of a YANG module in a directory form according to an embodiment of this application.

For a plurality of YANG modules in a network device, YANG files may be classified as one or more YANG packages in a directory form in the network device based on service functions or other functions. The directory is named in a form of "package name-package version". For example, as shown in FIG. 6, for a directory ietf-network-device@1.1.2, YANG files in the directory are shown in the upper right part in FIG. 6, where ietf-network-device indicates a package name, and 1.1.2 indicates a version. For a directory ietf-network-device@2.1.2, YANG files in the directory are shown in the lower right part in FIG. 6, where ietf-network-device indicates a package name, and 2.1.2 indicates a version.

Figure 7:
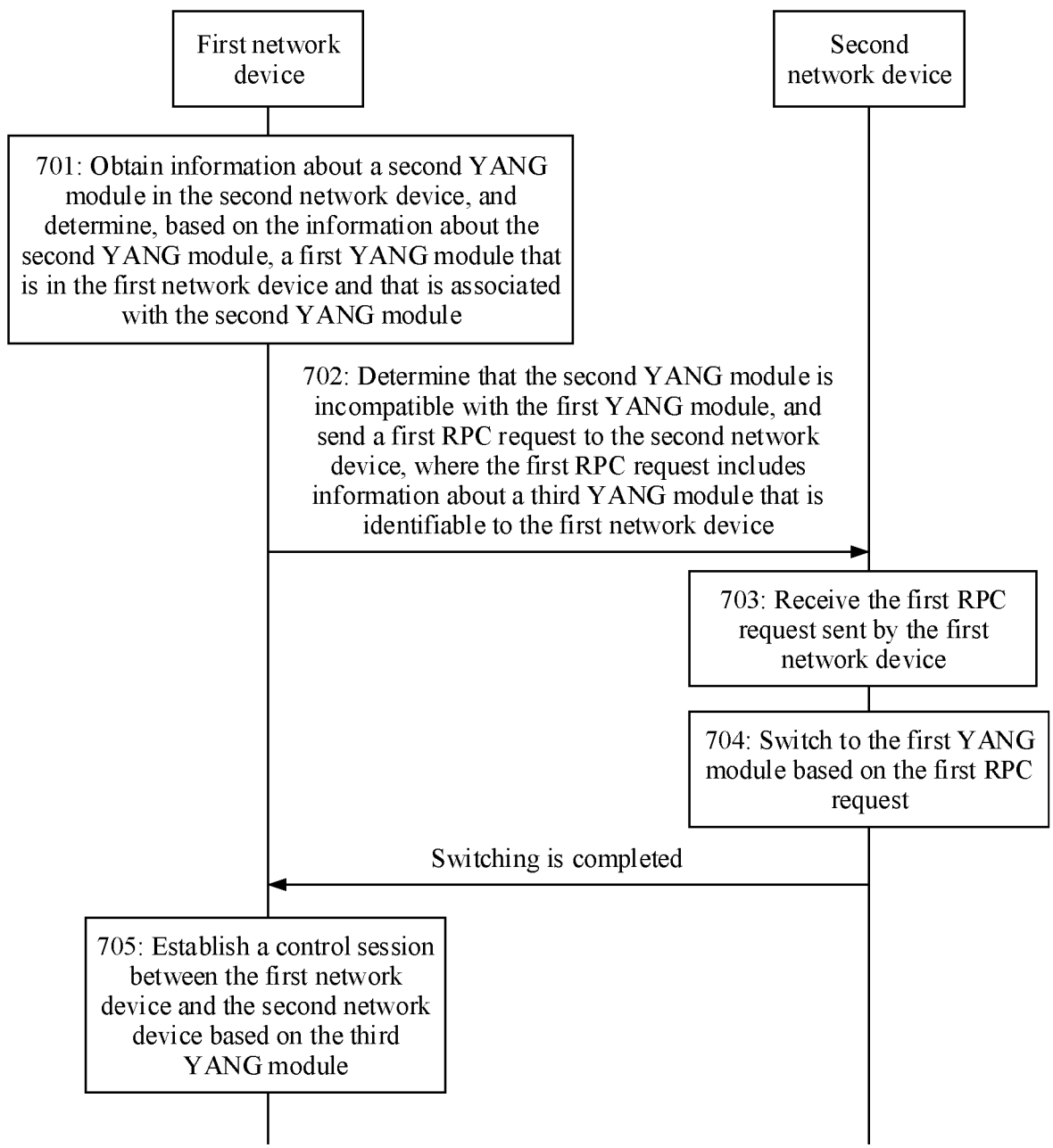
FIG. 7 is a schematic diagram of an interaction process of a device management method according to an embodiment of this application.

The following describes a method provided in an embodiment of this application by using an example in which a managing device is a first network device and a managed device is a second network device, and with reference to a schematic diagram of an interaction process shown in FIG. 7. The method includes the following processes:

701: The first network device obtains information about a second YANG module in the second network device, and determines, based on the information about the second YANG module, a first YANG module that is in the first network device and that is associated with the second YANG module.

For example, when the first network device obtains the information about the second YANG module in the second network device, the first network device may read YANG package information such as version information in yang-library in the second network device by using a second RPC request message such as <get-dat>. The second network device returns YANG package data to the first network device, and the first network device obtains the information about the second YANG module in the second network device. Then, the first network device may determine, based on the information about the second YANG module, the first YANG module that is in the first network device and that is associated with the second YANG module.

702: The first network device determines that the second YANG module is incompatible with the first YANG module, and sends a first RPC request message to the second network device, where the first RPC request message includes information about a third YANG module that is identifiable to the first network device.

After determining the first YANG module that is in the first network device and that is associated with the second YANG module, the first network device may compare the second YANG module and the first YANG module for a difference. For example, the first network device finds that the second YANG module existing in the second network device is incompatible with the first YANG module in the first network device, and generates the first RPC request message, where the first RPC request message is used to trigger the second network device to switch a YANG module that is running to the third YANG module. For example, the first network device generates a <select-yang-packages> RPC request packet for YANG package switching. The first YANG module includes the third YANG module.

For example, a configuration file shown in FIG. 5A and FIG. 5B is used as an example. YANG packages such as ietf-evpn and openconfig-evpn that are incompatible with a huawei-evpn package are indicated and listed by using incompatible-packages. All the information is recorded in yang-library. The first network device may query the information. Alternatively, the second network device may actively report the information after establishing a connection.

For another example, in a directory shown in FIG. 6, a version of a YANG package includes three digits, for example, X·Y·Z. If the package is updated to be non-backwards-compatible, a version value (X+1)·Y·Z is assigned to the package of the new version. If the package is updated to be backwards-compatible, a version value X·(Y+1)·Z or X·Y·(Z+1) is assigned to the package of the new version. For example, in FIG. 6, ietf-network-device@2.1.2 is incompatible with ietf-network-device@1.1.2.

In an example embodiment, because the network device supports only a YANG module set of a specific standard/version at a moment, the method provided in this embodiment of this application defines an RPC request for module switching. For example, when the second network device goes online as a new device or the second network device is reconnected after disconnection or performs upgrading that is non-backwards-compatible, and the first network device does not perform synchronous upgrading in time, the first network device delivers the first RPC request message to the second network device, so that the second network device switches to a YANG package of a specific version, that is, the third YANG module supported by the first network device.

The new device is a device using a YANG module set that does not fall within, by default, a range of YANG module sets supported by the first network device. After the method provided in this embodiment of this application is used, the new device supports YANG module sets of at least two standards. For example, one standard is provided by a standards organization such as the IETF or OpenConfig. When the new device goes online for the first time, the new device may switch, by using the method provided in this embodiment of this application, the module set in the new device to a YANG module supported by the first network device.

When the second network device performs upgrading that is non-backwards-compatible and the first network device does not perform synchronous upgrading in time, the first network device may deliver the first RPC request message to the second network device before performing the synchronous upgrading, so that the second network device switches back to a module set of an earlier version and can be managed by the first network device.

It should be noted that, when the second network device performs upgrading that backwards-compatible, whether the first network device selects a module set whose version number is the same as that of a module set in the first network device and that is switched to or directly manages the second network device is determined according to a policy of the first network device. This is not limited in this embodiment of this application.

In other words, regardless of a specific case in which the first network device is triggered to send the first RPC request message to the second network device, in an example embodiment, before the first network device sends the first RPC request message to the second network device, the method further includes: The first network device reads the information about the second YANG module in the second network device by using the second RPC request message, and generates the first RPC request message when determining, based on the information about the second YANG module in the second network device, that the first YANG module that is in the first network device and that is associated with the second YANG module is incompatible with the second YANG module. Information about a YANG module includes but is not limited to version information of the YANG module. The first network device reads version information of the second YANG module in the second network device, compares the version information of the second YANG module in the second network device with version information of the first YANG module that exists in the first network device and that is associated with the second YANG module, to determine whether the first YANG module in the first network device is incompatible with the second YANG module in the second network device. If the first YANG module is incompatible with the second YANG module, the first network device is triggered to generate the first RPC request message.

For example, the first network device may be a controller. When the controller has a function of comparing YANG packages for a difference and a function of delivering a message for module set switching, the controller performs device management by using the method provided in this embodiment of this application. If the controller has an error during device management, or the controller does not have the function of comparing YANG packages for a difference or the function of delivering a message for module set switching, the controller may use another northbound tool such as a CLI to perform device management.

For example, the first network device may use the other northbound tool such as the CLI to read the version information of the second YANG module in the second network device, read, from the first network device, the version information of the first YANG module that exists in the first network device and that is associated with the second YANG module, and compare the version information of the second YANG module in the second network device with the version information of the first YANG module that exists in the first network device and that is associated with the second YANG module, to determine whether the first YANG module in the first network device is incompatible with the second YANG module in the second network device. If there is an incompatibility case, incompatibility information such as the version information of the incompatible YANG module is sent to the controller, and the controller generates the first RPC request message based on the incompatibility information. Alternatively, if there is an incompatibility case, the other northbound tool such as the CLI generates the first RPC request message based on incompatibility information, and sends the first RPC request message to the controller, and the controller sends the first RPC request message to the second network device.

For example, the first RPC request message includes the information about the third YANG module that is identifiable to the first network device. For example, the information about the third YANG module that is identifiable to the first network device includes version information of a set to which the third YANG module belongs.

The first RPC request message not only includes the information about the third YANG module that is identifiable to the first network device, but also includes one or more of the following information:
 (1) first indication information, where the first indication information is used to indicate that a fourth YANG module on which the third YANG module depends is to be switched;

(2) first option information, where the first option information is used to indicate that a target YANG module in the fourth YANG module on which the third YANG module depends remains unchanged; and (3) second option information, where the second option information is used to indicate that a target set is to be switched, and the target set is a set other than the set to which the third YANG module belongs.

Figures 8, 9:
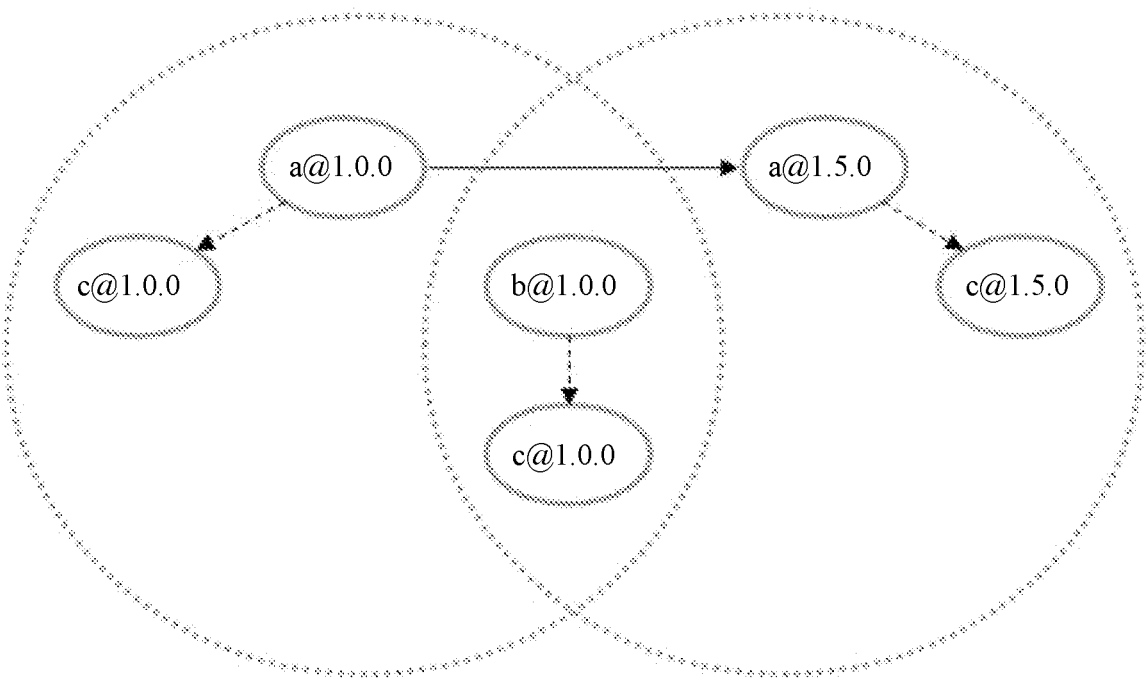
FIG. 8 is a schematic diagram of a structure of an RPC request according to an embodiment of this application.
FIG. 9 is a schematic diagram of a YANG module before and after switching according to an embodiment of this application.

For example, a structure of the first RPC request message may be shown in FIG. 8. In the first RPC request message shown in FIG. 8, datastore is a list node, and indicates a specific datastore by using a name subnode. The first network device may use the first RPC request message to indicate that a series of YANG packages is to be switched for several datasets (datastores). A package node indicates specific YANG packages to be switched for the datastore. A YANG package is determined by using name and version subnodes. A with-imported node is a presence container node, namely, the first indication information. The with-imported node indicates that during switching of the YANG package, a YANG package on which the YANG package depends is also selected for switching. When the with-imported node is not used, switching is not performed for an entire dependency chain by default.

The with-imported node is mainly used to resolve some conflict problems between YANG packages. As shown in FIG. 9, three YANG packages a@1.0.0, b@1.0.0, and c@1.0.0 are originally used in the second network device, where the package c is a package on which the packages a and b depend. After the first network device delivers, to the second network device, the first RPC request message for module set switching, the package a@1.0.0 is switched to a package a@1.5.0. If the first RPC request message does not include the with-imported option, the second network device still uses the package c of the earlier version, that is, version 1.0.0. If the first RPC request message includes the with-imported option, during switching of the package a, the second network device may simultaneously switch the package c to a package c of a version on which the package a depends, that is, c@1.5.0.

In addition, as shown in FIG. 8, the first RPC request message further includes an exclude option. The exclude option is the first option information and is used to specify which dependent package remains unchanged. For example, if the exclude option specifies a specific YANG module for the fourth YANG module on which the third YANG module depends, the specific YANG module is used as a target YANG module, and the target YANG module remains unchanged. Optionally, the second network device switches a YANG module other than the target YANG module in the fourth YANG module on which the third YANG module depends.

In an example embodiment, as shown in FIG. 8, the first RPC request message further includes a with-datastore option. The with-datastore option is used to specify a specific datastore, namely, the target set, for which same switching needs to be performed, and the with-datastore option is the second option information. Before a Network Management Datastore Architecture (NMDA) architecture is used, datastores such as running, candidate, startup, and operational datastores actually use a same module set. After the NMDA architecture is used, these datasets may theoretically use different module sets. However, this is not limited in this embodiment of this application. Therefore, the with-datastore option is provided. When same switching needs to be simultaneously performed for a plurality of datastores, the with-datastore option may be used.

703: The second network device receives the first RPC request message sent by the first network device.

There is a communication connection between the first network device and the second network device, and the second network device may receive, through the communication connection, the first RPC request message sent by the first network device. For content of the first RPC request message, refer to the descriptions in 702. Details are not described herein again.

704: The second network device switches to the third YANG module based on the first RPC request message.

In an example embodiment, the switching to the third YANG module based on the first RPC request message includes: unloading a currently loaded YANG module and loading the third YANG module based on the first RPC request message.

In addition, the first RPC request message may include other optional information in addition to the information about the third YANG module supported by the first network device. In an example embodiment, when the first RPC request message further includes the first indication information, because the first indication information is used to indicate that the fourth YANG module on which the third YANG module depends is to be switched, after switching to the third YANG module based on the first RPC request message, the second network device further switches the fourth YANG module on which the third YANG module depends.

In an example embodiment, when the first RPC request message further includes the first option information, because the first option information is used to indicate that the target YANG module in the fourth YANG module on which the third YANG module depends remains unchanged, after switching to the third YANG module based on the first RPC request message, the second network device further switches a non-target YANG module in the fourth YANG module on which the third YANG module depends.

In an example embodiment, when the first RPC request message further includes the second option information, because the second option information is used to indicate that the target set is to be switched, and the target set is the set other than the set to which the third YANG module belongs, after switching to the third YANG module based on the first RPC request message, the second network device further switches the target set.

Further, regardless of a specific YANG module to be switched, in an example embodiment, before the unloading a currently loaded YANG module and loading the third YANG module based on the first RPC request message, the second network device further obtains a YANG module list based on the currently loaded YANG module and the third YANG module, where the YANG module list does not include a YANG module that conflicts with the third YANG module; the second network device detects whether a dependency chain for the YANG module list is complete; and when the dependency chain for the YANG module list is complete, the second network device performs the step of unloading a currently loaded YANG module and loading the third YANG module based on the first RPC request message.

It should be noted that if the fourth YANG module on which the third YANG module depends is switched, the non-target YANG module is switched, or the target set is switched, the YANG module list may further include a fourth YANG module on which a third YANG module that is switched to depends, a non-YANG module that is switched to, or a YANG module included in a target set that is switched to. The fourth YANG module on which the third YANG module that is switched to depends, the non-YANG module that is switched to, or the YANG module included in the target set that is switched to may be used as a to-be-switched YANG package. According to the method provided in this embodiment of this application, completeness of a dependency chain is also detected for these YANG modules.

For example, a second network device uses a private YANG from a vendor of the second network device by default. After the second network device receives an RPC packet for module set switching shown in FIG. 10, that is, the first RPC request message, the second network device first adds a to-be-switched YANG package to a list of currently loaded YANG packages, and deletes, from the list, a package that conflicts with these YANG packages (for example, querying whether there is a conflict by using an incompatible-packages node in yang-library), to obtain a new temporary YANG package list. Then, the second network device checks whether a dependency chain for the YANG package list is complete, in other words, whether a package on which each YANG package depends (for example, a YANG package listed in an imported-packages node) can be found from the list. If the dependency chain is incomplete, the second network device returns a corresponding error.

For example, if the second network device detects that the dependency chain for the YANG module list is incomplete, the second network device returns a corresponding error to the first network device, as shown in FIG. 11. An error-path node displays, in an xpath form, which package fails to be loaded. The following information is used as an example:

/select-yang-packages/datastore[name='running']/package[name='ietf-network-device'].

Specific error information is displayed in error-message. If the error is caused because the dependency chain is incomplete, according to the method provided in this embodiment of this application, a specific missing package may be further prompted. For example, an ietf-network-device package depends on a package named ietf-data. After the second network device receives the first RPC request message for module set switching, if the second network device finds that the package is missing when detecting a new package list, the second network device provides error information shown in FIG. 11. After receiving the error information shown in FIG. 11 and providing a reply, the first network device includes the missing package by using a package node or a with-imported node in the select-yang-packages packet.

In addition, if the second network device does not have a required YANG package, error-message indicates error information "there is no\*\*\*package in device", as shown in FIG. 12.

The foregoing provides descriptions by merely using an example in which the second network device returns the corresponding error to the first network device when detecting that the dependency chain for the YANG module list is incomplete. When the second network device detects that the dependency chain for the YANG module list is complete, the second network device unloads a loaded YANG package that conflicts with the to-be-switched YANG package (for example, unloading a YANG module in these YANG packages). Then, the second network device loads and parses a YANG module in the to-be-switched YANG package from a corresponding directory in the second network device based on a name and a version number of the to-be-switched YANG package in the first RCP request. For example, in some content in a YANG package shown in FIG. 13, a YANG module in an ietf-network-device@1.1.2 package is loaded and parsed from a corresponding directory in the second network device. As shown by the arrow in FIG. 13, the second network device currently uses a YANG package abc-network-device@1.1.0. After the second network device receives an RPC request for YANG package switching, if the RPC request indicates that ietf-network-device@1.1.2 is to be switched to, the second network device performs YANG package switching from the originally used YANG package abc-network-device@1.1.0 to using the YANG package ietf-network-device@1.1.2.

Regardless of switching to the third YANG module, switching to another YANG module, or switching to all YANG modules in the target set, when the second network device receives the first RPC request message, after the second network device obtains configuration data of a YANG module and successfully loads a new YANG module, a service component on the second network device may execute service logic. The service component is a program that finally completes service processing logic, and the service component usually subscribes to service-related data of the service component from a subscription and distribution module of the second network device by using, for example, a subscription-publish mechanism. After the configuration data in the second network device changes, the subscription and distribution module pushes changed configuration data to a service component that subscribes to the configuration data. After receiving the changed configuration data, the service component further completes service processing logic.

Figure 15:
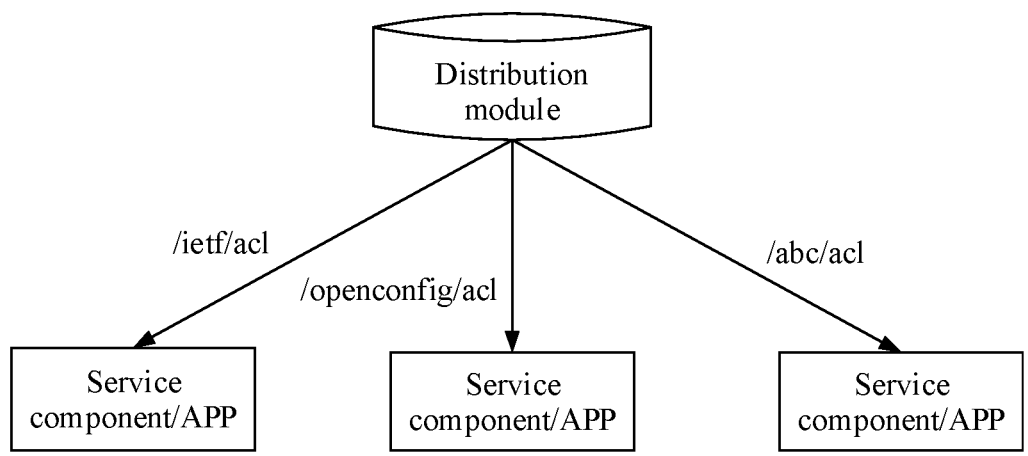
FIG. 15 is a schematic diagram of a structure of a service component according to an embodiment of this application.
Figure 16:
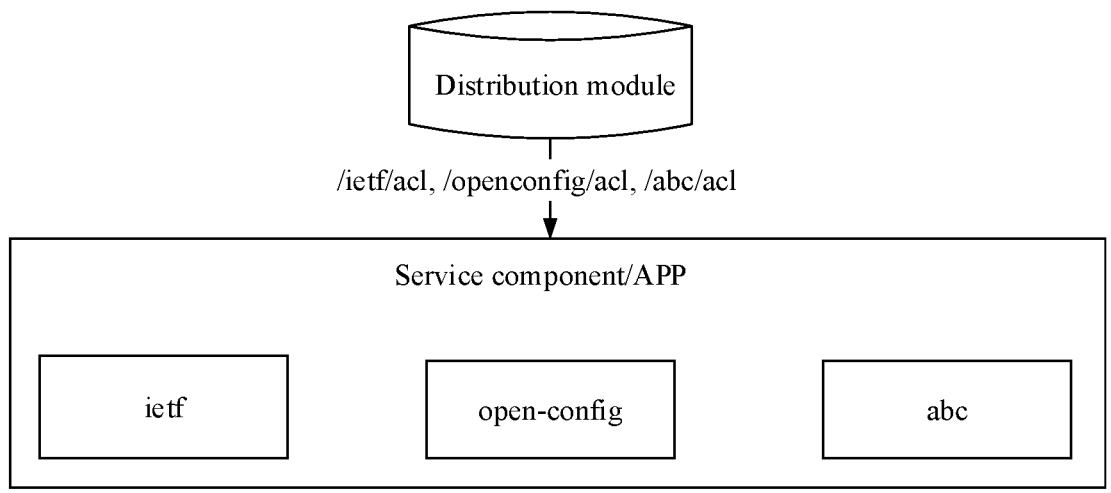
FIG. 16 is a schematic diagram of a structure of a service component according to an embodiment of this application.

When the second network device originally supports only one YANG module set, a single service function corresponds to one service component, as shown in FIG. 14. acl, bgp, and evpn correspond to respective service components/APPs. However, according to the method provided in this embodiment of this application, when the second network device may support a plurality of YANG module sets, corresponding service components may be added. Therefore, for a purpose of ensuring that a YANG module that is switched to can be normally used, in an example embodiment, after the switching to the third YANG module based on the first RPC request message, the method further includes: terminating an original service component, and running a new service component corresponding to the third YANG module. For example, for the component corresponding to acl shown in FIG. 14, a new acl component is added to obtain three acl components, as shown in FIG. 15. A manner of adding a service component includes but is not limited to duplicating the original component and then modifying the original component to obtain the new service component. Alternatively, the new business component may be directly generated. In addition, functions of the original service component may be extended, and the service component performs secondary data distribution, as shown in FIG. 16. The functions of the original service component/APP are extended. After the subscription and distribution module distributes corresponding functions to the service component, the service component distributes the functions.

According to the method provided in this embodiment of this application, when a device that does not go online for the first time upgrades a module, a data upgrading problem arises regardless of whether the upgrade is backwards-compatible or not. Because there is no universal standard or rule for a mapping relationship between an unloaded YANG module and a YANG module that is switched to, a mapping rule may be manually hard-coded into a script file or a file in a format. When data upgrading is triggered, a specific module uses original data as an input and the mapping rule in a mapping script as processing logic to calculate corresponding new module data. A module change is mainly reflected in the following three cases:

Case 1: A path of the unloaded YANG module in the third YANG module that is switched to changes. In the case 1, a service function still exists, but a representation manner of a related node of a service is changed to an external representation manner. For example, a path of the service or a name of the node of the service is changed, but a presentation manner of the service in a service APP usually remains unchanged. Actually, such data upgrading does not bring about a change to the service.

Case 2: The unloaded YANG module is deleted from the third YANG module that is switched to. For such upgrading, the device needs to notify a corresponding APP of the deletion change, so that the APP performs a corresponding resource clearing or releasing operation. When backward compatibility is supported, a case in which a node is deleted should not exist.

Case 3: The third YANG module that is switched to includes a node that cannot be found in the unloaded YANG module. For such upgrading, if the unloaded module does not include corresponding data, corresponding module data cannot be constructed. Therefore, there is no need to consider this case.

For the case 1 and the case 2, during data upgrading, that is, during switching to the third YANG module, if the third YANG module is backwards-compatible with the unloaded YANG module, the device does not need to generate difference information brought in the data upgrading process because the APP does not need to be switched and a deletion case as described in the case 2 does not occur. If the third YANG module is non-backwards-compatible with the unloaded YANG module, the device actually generates two pieces of difference information. One is data of the unloaded module and the other is data of the third YANG module that is switched to. As shown in FIG. 16, the device uniformly delivers the two pieces of data to the subscription and distribution module, and the subscription and distribution module notifies an APP component of the two pieces of data. For example, a child APP of the original service component is first used to clear and release a resource. After the child APP of the original service component is terminated, a new YANG package, namely, a child APP corresponding to the third YANG module, that is, the new service component, is run, and the new service component processes data of the YANG module.

Therefore, in an example embodiment, the terminating an original service component, and running a new service component corresponding to the third YANG module includes: the second network device generates first difference information based on data of the unloaded YANG module, and generates second difference information based on data of the third YANG module; and the second network device controls, based on the first difference information, the original service component to clear and release a resource, and runs, based on the second difference information, the new service component corresponding to the third YANG module to execute a service. To be specific, before the third YANG module is switched to, the original service component is first controlled to clear and release the resource, and then the new service component is run, to implement smooth service transition.

It should be noted that both manners shown in FIG. 15 and FIG. 16 are implemented through addition. A difference is whether an independent component is added or one component is used to implement a plurality of functions. A specific manner to be used is not limited in this embodiment of this application. In an example embodiment, to run the new service component corresponding to the third YANG module, the corresponding new service component may be determined based on a mapping relationship between a service component and a YANG package. For example, the mapping relationship between a service component and a YANG package may be recorded in a configuration file in the device. When a YANG package is to be switched, a service component that has a mapping relationship with the YANG package may be queried from the configuration file, and the service component is used as the new service component for running.

Figures 17, 18:
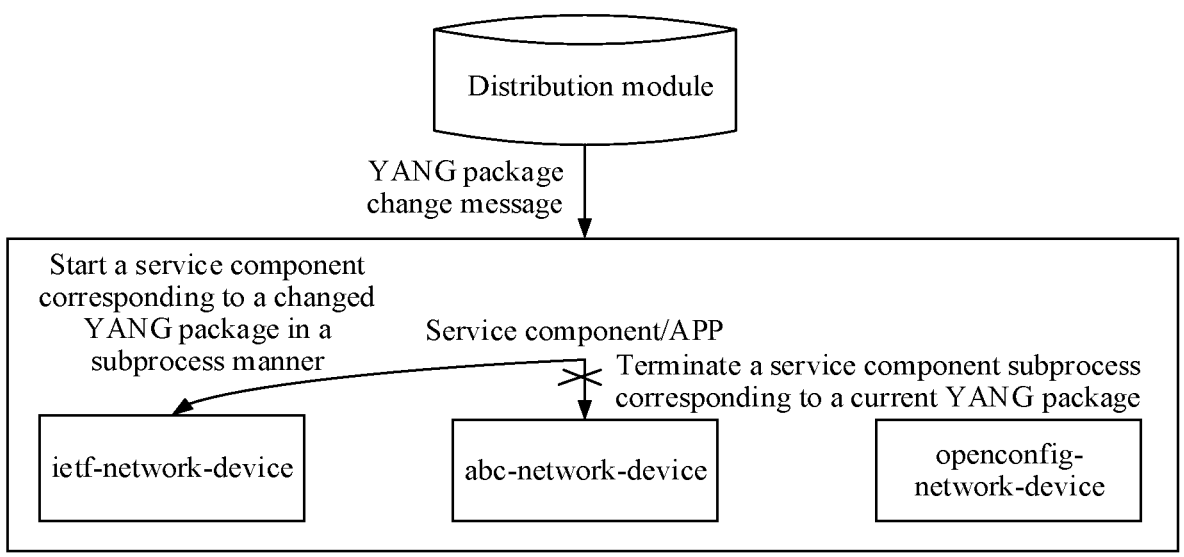
FIG. 17 is a schematic diagram of a structure of a configuration file for a mapping relationship between a service component and a YANG module according to an embodiment of this application.
FIG. 18 is a schematic diagram of managing a network device by a controller according to an embodiment of this application.

For example, the configuration file is shown in FIG. 17. The second network device sends one or more YANG package change messages to the subscription and distribution module. All service components may subscribe to such messages, and specifically subscribe to different messages. A structure shown in FIG. 16 is used as an example. As shown in FIG. 18, after listening to a YANG package change message, a parent service component first terminates a child service component corresponding to a current YANG package, then queries the configuration file for child service components associated with a YANG package in the RPC request packet, and starts the child service components by using a subprocess. In an example embodiment, the second network device may alternatively first start the new service component, and then terminate the original service component. A sequence of starting the new service component and terminating the original service component is not limited in this embodiment of this application.

Figure 19:
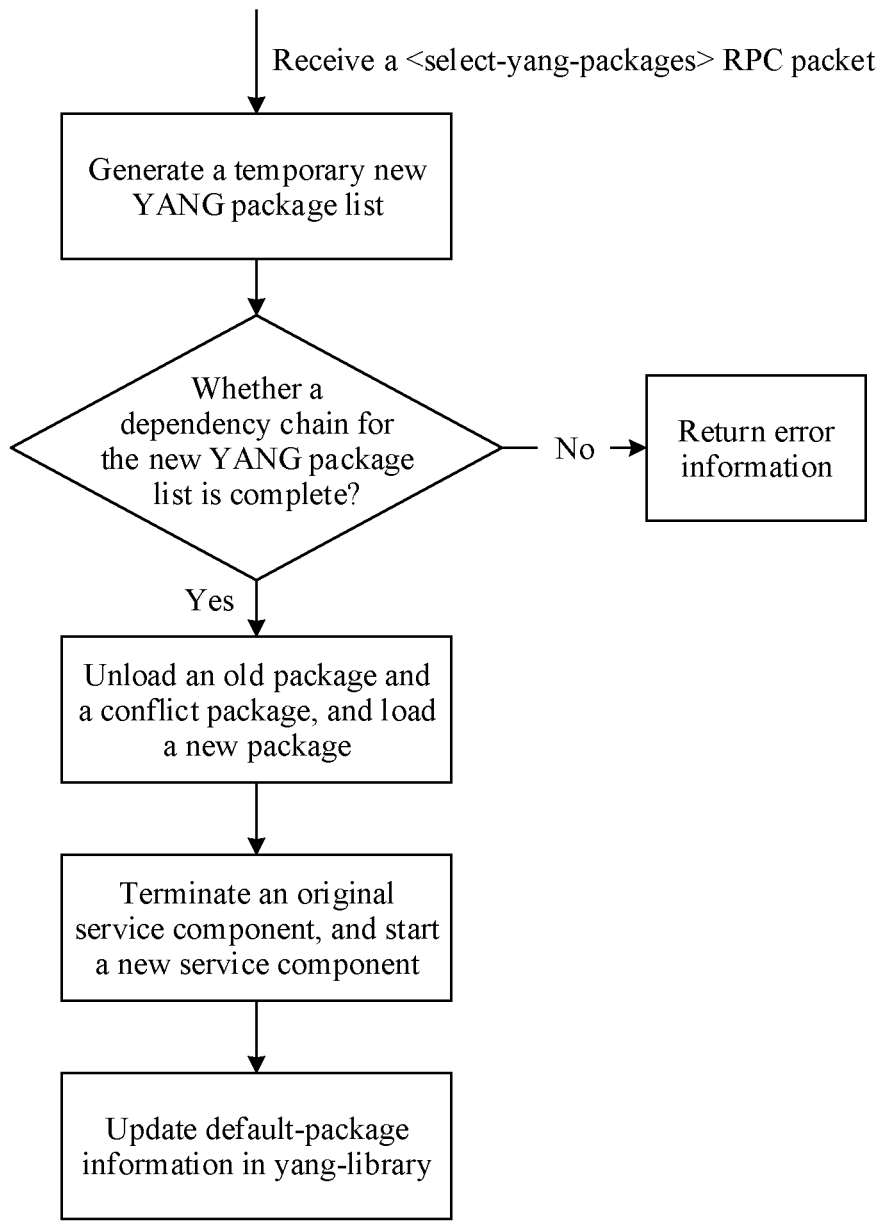
FIG. 19 is a schematic diagram of a device management procedure according to an embodiment of this application.

In conclusion, after the second network device receives the first RPC request message, a YANG module switching process may be shown in FIG. 19. After receiving a <select-yang-packages> RPC request packet, the second network device generates a temporary new YANG package list, detects whether a dependency chain for the new YANG package list is complete, and returns an error to the first network device if the dependency chain for the new YANG package list is incomplete. If the dependency chain for the new YANG package list is complete, the second network device unloads an old package and a conflict package, and loads a new package. Then, the second network device terminates an original service component and runs (starts) a new service component. If the new service component is run, it indicates that a module set is successfully switched. The second network device updates information about the current YANG package to a working-package list node in yang-library.

Figure 20:
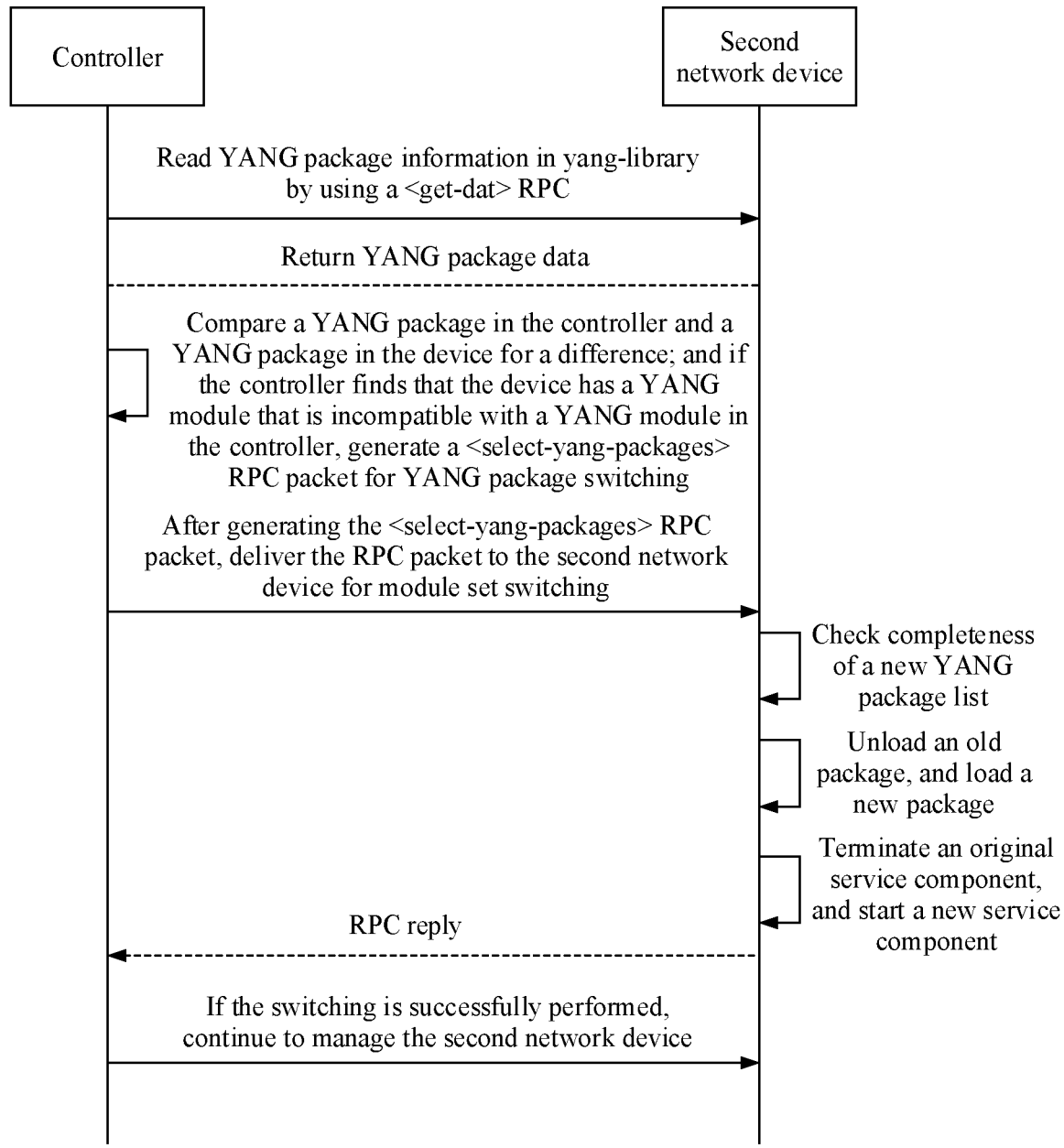
FIG. 20 is a schematic diagram of a device management procedure according to an embodiment of this application.

When the first network device is a controller, if the controller supports comparison of YANG packages for a difference, an interaction procedure between the controller and the second network device according to the device management method may be shown in FIG. 20. The controller reads YANG package information such as version information in yang-library in the second network device by using a <get-dat> RPC. The second network device returns YANG package data to the first network device. The controller compares a YANG package in the controller with a YANG package in the device for a difference. For example, if the controller finds that the device has a YANG module that is incompatible with a YANG module in the controller, the controller generates a <select-yang-packages> RPC request packet for YANG package switching. The controller sends the generated <select-yang-packages> RPC request packet to the second network device for module set switching. The second network device forms a new YANG package list based on the RPC request, and checks completeness of a dependency chain for the new YANG package list. If a check result is that the dependency chain for the new YANG package list is complete, the second network device unloads an old package and loads a new package. The second network device terminates an original service component and starts a new service component. If all the processes are successfully performed, the second network device returns an RPC reply to the controller, to notify the controller that the YANG module is successfully switched, and the controller may continue to manage the second network device. If an error occurs in any process, the second network device returns error information to the controller.

Figure 21:
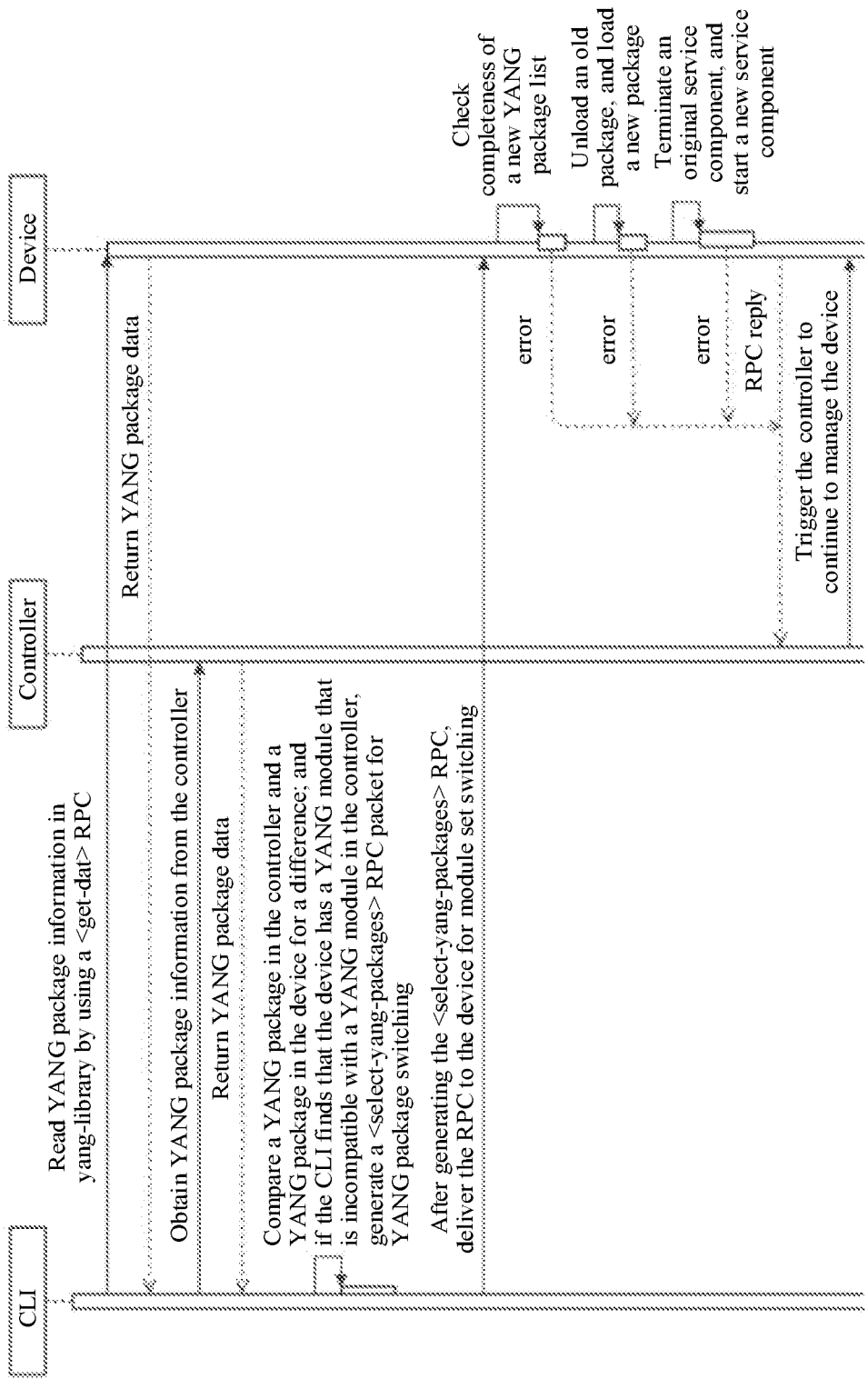
FIG. 21 is a schematic diagram of a device management procedure according to an embodiment of this application.

When the first network device is a controller, if the controller does not support comparison of YANG packages for a difference, the method provided in this embodiment of this application is further applied to a CLI device. An interaction procedure between the CLI device, the controller, and the second network device in the device management method may be shown in FIG. 21. The CLI device reads YANG package information such as version information in yang-library in the second network device by using a <get-dat> RPC. The second network device returns YANG package data to the CLI device. The CLI device further obtains YANG package information such as version information from the controller. Then, the CLI device compares a YANG package in the controller and a YANG package in the second network device for a difference. For example, if the CLI device finds that the second network device has a YANG module that is incompatible with a YANG module in the controller, the CLI device generates a <select-yang-packages> RPC request packet for YANG package switching. The CLI device sends the generated <select-yang-packages> RPC request packet to the second network device for module set switching. The second network device forms a new YANG package list based on the RPC request, and checks completeness of a dependency chain for the new YANG package list. If a check result is that the dependency chain for the new YANG package list is complete, the second network device unloads an old package and loads a new package. The second network device terminates an original service component and starts a new service component. If all the processes are successfully performed, the second network device returns an RPC reply to the controller, to notify the controller that the YANG module is successfully switched, and the controller may continue to manage the second network device. If an error occurs in any process, the second network device returns error information to the controller.

705: The first network device establishes a control session between the first network device and the second network device based on the third YANG module.

After the second network device switches to the third YANG module, because the third YANG module is a YANG module supported by the first network device, the first network device may manage the second network device based on the third YANG module. For example, the first network device establishes the control session between the first network device and the second network device based on the third YANG module.

In an example embodiment, before the first network device establishes the control session between the first network device and the second network device based on the third YANG module, the first network device receives an RPC reply message, where the reply message indicates that switching has been performed.

In this embodiment of this application, a device management procedure mainly includes replacing a YANG package. If a classification granularity for YANG packages is increased, a YANG package conflict caused by a small-granularity YANG package can be avoided. However, in a manner of a large granularity, because a granularity for a YANG package is restricted, a large-granularity YANG package is used less flexible than a small-granularity YANG package. The classification granularity for YANG packages is not limited in this embodiment of this application, and may be flexibly adjusted based on an application scenario.

In addition, only a module-set node is used as an example for description. In an example embodiment, the method provided in this embodiment of this application further supports in augmenting a package to a schema node in yang-library instead of to the module-set node. In yang-library, a datastore can be bound to only one schema, and there is no imported-packages list node in the package. Therefore, the package herein is actually a complete module set, as shown in FIG. 22. A version of a YANG package and an organization form of the YANG package in a device are consistent with the structure of the YANG package shown in FIG. 4. However, packages are not further classified based on service functions or other functions, as shown in FIG. 23. All ietf-related YANG files are aggregated into a YANG package, and a same manner is applied to openconfig-related and huawei-related YANG files. Certainly, several IETF packages may be sorted out based on versions. However, these IETF packages are complete and no longer need to depend on other YANG packages.

In addition, a YANG package is a complete large-granularity package, and for one datastore, only one YANG package can be switched. Therefore, the select-yang-packages packet can be simplified. For example, after receiving an RPC for module set switching, the device no longer needs to check completeness of a dependency chain for a YANG package because the YANG package no longer depends on any other package. In a simplified procedure, processes of unloading an old package and loading a new package and a YANG module are similar to those described in 703. Details are not described again. There is no package conflict caused by a small-granularity package. Therefore, the overall procedure on the device side in this embodiment is relatively simple.

According to the method provided in this embodiment of this application, when the network device supports switching between YANG modules of different standards, the second network device is notified, by using an RPC, to switch to a YANG module supported by the first network device. This can reduce dependence of the second network device on the first network device when the second network device is managed by the first network device, expand an application range of the network device, and improve device management efficiency.

Figure 24:
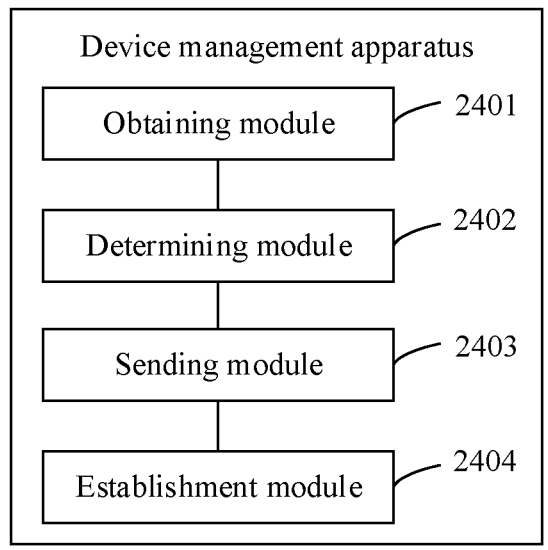
FIG. 24 is a schematic diagram of a structure of a device management apparatus according to an embodiment of this application.

A device management apparatus is provided. The apparatus is applied to a first network device, and the device management apparatus performs, via a plurality of modules shown in FIG. 24, the functions performed by the first network device in FIG. 7. As shown in FIG. 24, the apparatus includes: an obtaining module 2401, configured to obtain information about a second yet another next generation YANG module in a second network device, where the first network device is a network management device; a determining module 2402, configured to: determine, based on the information about the second YANG module, a first YANG module that is in the first network device and that is associated with the second YANG module; and determine that the second YANG module is incompatible with the first YANG module; a sending module 2403, configured to send a first RPC request message to the second network device, where the first RPC request message includes information about a third YANG module that is identifiable to the first network device, the first YANG module includes the third YANG module, and the first RPC request message is used to trigger the second network device to switch a YANG module that is running to the third YANG module; and an establishment module 2404, configured to establish a control session between the first network device and the second network device based on the third YANG module.

In an example embodiment, the information about the third YANG module that is identifiable to the first network device includes version information of a set to which the third YANG module belongs.

In an example embodiment, the first RPC request message further includes first indication information, and the first indication information is used to indicate that a fourth YANG module on which the third YANG module depends is to be switched.

In an example embodiment, the first RPC request message further includes first option information, and the first option information is used to indicate that a target YANG module in the fourth YANG module on which the third YANG module depends remains unchanged.

In an example embodiment, the first RPC request message further includes second option information, the second option information is used to indicate that a target set is to be switched, and the target set is a set other than the set to which the third YANG module belongs.

In an example embodiment, the second YANG module in the second network device is a YANG module that is currently running in the second network device.

In an example embodiment, before the first network device establishes the control session between the first network device and the second network device based on the third YANG module, the first network device receives an RPC reply message, where the reply message indicates that switching has been performed.

Figure 25:
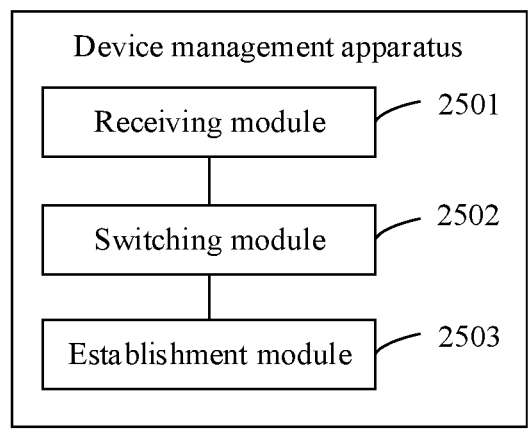
FIG. 25 is a schematic diagram of a structure of a device management apparatus according to an embodiment of this application.

An embodiment of this application provides a device management apparatus. The apparatus is applied to a second network device, and the device management apparatus performs, via a plurality of modules shown in FIG. 25, the functions performed by the second network device in FIG. 7. As shown in FIG. 25, the apparatus includes: a receiving module 2501, configured to receive a first RPC request message sent by a first network device, where the first RPC request message includes information about a third yet another next generation YANG module that is identifiable to the first network device, the third YANG module is included in a first YANG module, the first YANG module is determined by the first network device based on information about a second YANG module in the second network device, and the first RPC request message is used to trigger the second network device to switch a YANG module that is running to the third YANG module; a switching module 2502, configured to switch to the third YANG module based on the first RPC request message; and an establishment module 2503, configured to establish a control session between the first network device and the second network device based on the third YANG module.

In an example embodiment, the switching module 2502 is configured to unload a currently loaded YANG module and load the third YANG module based on the first RPC request message.

In an example embodiment, the switching module 2502 is further configured to terminate an original service component, and run a new service component corresponding to the third YANG module.

In an example embodiment, the switching module 2502 is configured to: generate first difference information based on data of the unloaded YANG module, and generate second difference information based on data of the third YANG module; and control, based on the first difference information, the original service component to clear and release a resource, and run, based on the second difference information, the new service component corresponding to the third YANG module to execute a service.

In an example embodiment, the switching module 2502 is further configured to: when the first RPC request message further includes first indication information, switch a fourth YANG module on which the third YANG module depends, where the first indication information is used to indicate that the fourth YANG module on which the third YANG module depends is to be switched.

In an example embodiment, the switching module 2502 is further configured to: when the first RPC request message further includes first option information, switch a non-target YANG module in the fourth YANG module on which the third YANG module depends, where the first option information is used to indicate that a target YANG module in the fourth YANG module on which the third YANG module depends remains unchanged.

In an example embodiment, the switching module 2502 is further configured to switch a target set when the first RPC request message further includes second option information, where the second option information is used to indicate that the target set is to be switched, and the target set is a set other than a set to which the third YANG module belongs.

In an example embodiment, the apparatus further includes: an obtaining module, configured to obtain a YANG module list based on the currently loaded YANG module and the third YANG module, where the YANG module list does not include a YANG module that conflicts with the third YANG module; and a detection module, configured to detect whether a dependency chain for the YANG module list is complete.

The switching module is configured to: when the dependency chain for the YANG module list is complete, perform the step of unloading a currently loaded YANG module and loading the third YANG module based on the first RPC request message.

It should be understood that, when the apparatus provided in FIG. 24 or FIG. 25 implement functions of the apparatus, division into the functional modules is merely used as an example for description. During actual application, the functions may be allocated to different functional modules for implementation based on a requirement. In other words, an inner structure of a device is divided into different functional modules, to implement all or some of the functions described above. In addition, the apparatuses provided in the foregoing embodiments and the method embodiments are based on a same concept. For a specific implementation process, refer to the method embodiments, and details are not described herein again.

Figure 26:
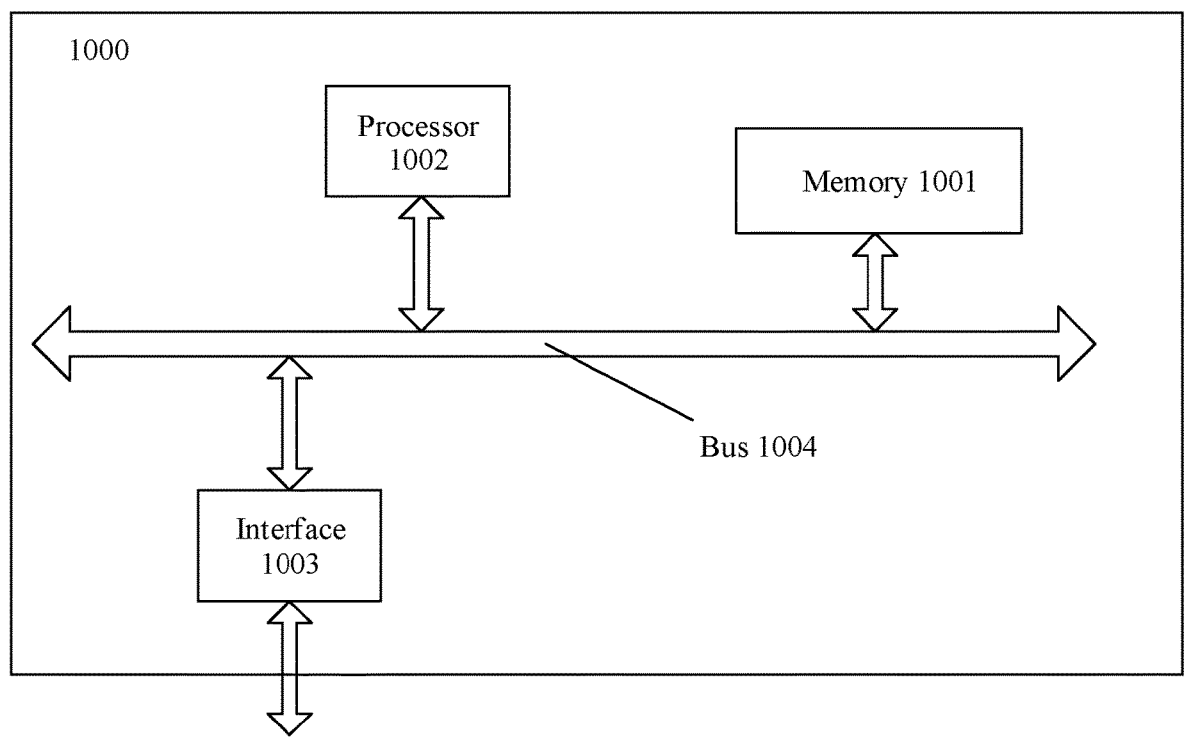
FIG. 26 is a schematic diagram of a structure of a network device according to an embodiment of this application.

Refer to FIG. 26. An embodiment of this application further provides a network device 1000. The network device 1000 shown in FIG. 26 is configured to perform operations related to the foregoing network device management method. The network device 1000 includes a memory 1001, a processor 1002, and an interface 1003. The memory 1001, the processor 1002, and the interface 1003 are connected to each other by using a bus 1004.

The memory 1001 stores at least one instruction. The at least one instruction is loaded and executed by the processor 1002, to implement any one of the foregoing network device management methods.

The interface 1003 is used for communication with another device in a network. The interface 1003 may implement communication in a wireless or wired manner. For example, the interface 1003 may be a network adapter. For example, the network device 1000 may communicate with a server through the interface 1003.

It should be understood that FIG. 26 shows only a simplified design of the network device 1000. During actual application, the network device may include any quantity of interfaces, processors, or memories. In addition, the processor may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an Advanced Reduced Instruction Set Computing Machines (ARM) architecture.

Further, in an optional embodiment, the memory may include a read-only memory and a random-access memory (RAM), and provide instructions and data for the processor. The memory may further include a nonvolatile RAM. For example, the memory may further store information about a device type.

The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a RAM, used as an external cache. By way of example but not limitation, many forms of RAMS may be used, for example, a static random-access memory (SRAM), a dynamic random random-access memory (DRAM), a synchronous dynamic random-access memory (SDRAM), a double data rate synchronous dynamic random-access memory (DDR SDRAM), an enhanced synchronous dynamic random access memory (ESDRAM), a SynchLink dynamic random-access memory (SLDRAM), and a direct Rambus random-access memory (DR RAM).

A network management system is further provided. The system includes a first network device and a second network device. The first network device is configured to perform the functions performed by the first network device in the foregoing network management method, and the second network device is configured to perform the functions performed by the second network device in the foregoing network management method.

A computer-readable storage medium is further provided. The storage medium stores at least one instruction. A processor loads and executes the instruction, to implement any one of the foregoing network management methods.

This application provides a computer program. When the computer program is executed by a computer, a processor or the computer may be enabled to perform corresponding operations and/or procedures in the foregoing method embodiments.

All or some of the foregoing embodiments may be implemented by using software, hardware, firmware, or any combination thereof. When software is used to implement the embodiments, the embodiments may be implemented partially in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely the embodiments of this application, but are not intended to limit this application. Any modification, equivalent replacement, or improvement made without departing from the principle of this application shall fall within the protection scope of this application.

What is claimed is:

1. A method, comprising:
   obtaining information about a second yet another next generation (YANG) module in a second network device;
   sending, in response to the second YANG module in the second network device being incompatible with a first YANG module in a first network device, a first remote procedure call (RPC) request message to the second network device, wherein the first RPC request message comprises information about a third YANG module that is identifiable to the first network device, wherein the first YANG module comprises the third YANG module, and wherein the first RPC request message is configured to trigger the second network device to switch from a YANG module that is running to the third YANG module; and
   establishing a control session between the first network device and the second network device based on the third YANG module.

2. The method of claim 1, wherein the information comprises version information of a set to which the third YANG module belongs.

3. The method of claim 1, wherein the first RPC request message further comprises first indication information, and wherein the first indication information indicates that a fourth YANG module on which the third YANG module depends is to be switched.

4. The method of claim 3, wherein the first RPC request message further comprises first option information, and wherein the first option information indicates that a target YANG module in the fourth YANG module remains unchanged.

5. The method of claim 1, wherein the first RPC request message further comprises second option information, wherein the second option information indicates that a target set is to be switched, wherein the third YANG module belongs to a first set, and wherein the target set is a set other than the first set.

6. The method of claim 1, wherein the second YANG module is currently running in the second network device.

7. The method of claim 1, wherein before the first network device establishes the control session, the method further comprises receiving an RPC reply message, and wherein the RPC reply message indicates that switching has been performed.

8. An apparatus, comprising:
a non-transitory memory configured to store instructions; and
one or more processors coupled to the non-transitory memory, wherein the instructions, when executed by the one or more processors, cause the apparatus to:
obtain information about a second yet another next generation (YANG) module in a second network device;
send, in response to the second YANG module in the second network device being incompatible with a first YANG module in a first network device, a first remote procedure call (RPC) request message to the second network device, wherein the first RPC request message comprises information about a third YANG module that is identifiable to the first network device, wherein the first YANG module comprises the third YANG module, and wherein the first RPC request message is configured to trigger the second network device to switch a YANG module that is running to the third YANG module; and
establish, based on the third YANG module, a control session between the first network device and the second network device.

9. The apparatus of claim 8, wherein the information comprises version information of a set to which the third YANG module belongs.

10. The apparatus of claim 8, wherein the first RPC request message further comprises first indication information, and wherein the first indication information indicates that a fourth YANG module on which the third YANG module depends is to be switched.

11. The apparatus of claim 10, wherein the first RPC request message further comprises first option information, and wherein the first option information indicates that a target YANG module in the fourth YANG module remains unchanged.

12. The apparatus of claim 8, wherein the first RPC request message further comprises second option information, wherein the second option information indicates that a target set is to be switched, wherein the third YANG module belongs to a first set, and wherein the target set is a set other than the first set.

13. The apparatus of claim 8, wherein the second YANG module is currently running in the second network device.

14. The apparatus of claim 8, wherein before the apparatus establishes the control session, the instructions further cause the apparatus to be configured to receive an RPC reply message, and wherein the RPC reply message indicates that switching has been performed.

15. A computer program product comprising instructions stored on a non-transitory computer-readable medium that, when executed by one or more processors, cause an apparatus to:
obtain information about a second yet another next generation (YANG) module in a second network device;
send, in response to the second YANG module in the second network device being incompatible with a first YANG module in a first network device, a first remote procedure call (RPC) request message to the second network device, wherein the first RPC request message comprises information about a third YANG module that is identifiable to the first network device, wherein the first YANG module comprises the third YANG module, and wherein the first RPC request message is configured to trigger the second network device to switch from a YANG module that is running to the third YANG module; and
establish a control session between the first network device and the second network device based on the third YANG module.

16. The computer program product of claim 15, wherein the information comprises version information of a set to which the third YANG module belongs.

17. The computer program product of claim 15, wherein the first RPC request message further comprises first indication information, and wherein the first indication information indicates that a fourth YANG module on which the third YANG module depends is to be switched.

18. The computer program product of claim 17, wherein the first RPC request message further comprises first option information, and wherein the first option information indicates that a target YANG module in the fourth YANG module remains unchanged.

19. The computer program product of claim 15, wherein the first RPC request message further comprises second option information, wherein the second option information indicates that a target set is to be switched, wherein the third YANG module belongs to a first set, and wherein the target set is a set other than the first set.

20. The computer program product of claim 15, wherein the second YANG module is currently running in the second network device.

21. The computer program product of claim 15, wherein before establishing the control session, the instructions further cause the apparatus to receive an RPC reply message, and wherein the RPC reply message indicates that switching has been performed.

* * * * *